United States Patent [19]
Hirose et al.

[11] Patent Number: 5,793,132
[45] Date of Patent: Aug. 11, 1998

[54] ELECTRIC WHEEL MOTOR

[75] Inventors: Yosihisa Hirose; Naoya Toida; Hiroo Kanke; Yoshiaki Kotani; Yoshihiro Iijima, all of Wako, Japan

[73] Assignee: Honda Giken Kogyo K.K., Tokyo, Japan

[21] Appl. No.: 663,676

[22] Filed: Jun. 14, 1996

[30] Foreign Application Priority Data

Jun. 30, 1995 [JP] Japan ................................ 7-186648

[51] Int. Cl.$^6$ ........................... H02K 11/00; H02K 9/00
[52] U.S. Cl. .................... 310/71; 310/67 R; 310/88
[58] Field of Search ............................. 310/71, 67 R, 310/87, 88

[56] References Cited

U.S. PATENT DOCUMENTS

| | | | |
|---|---|---|---|
| 4,205,246 | 5/1980 | Wise et al. | 310/68 C |
| 4,709,123 | 11/1987 | Yamashita et al. | 174/52.1 |
| 5,236,055 | 8/1993 | Legal | 180/65.5 |

*Primary Examiner*—Steven L. Stephan
*Assistant Examiner*—Judson H. Jones
*Attorney, Agent, or Firm*—Arthur L. Lessler

[57] ABSTRACT

An electric wheel motor mounted integrally in a wheel has at least one electric leader line extending from the inside of a motor main body of the motor to the outside thereof. A breather passage is provided in the at least one electric leader line and communicates the inside of the motor main body with the outside thereof.

16 Claims, 3 Drawing Sheets

ELECTRIC WHEEL MOTOR

BACKGROUND OF THE INVENTION

1. Field of the Invention

This invention relates to an electric wheel motor which is mounted integrally in a wheel of a vehicle or a like apparatus, for driving the same.

2. Prior Art

Conventionally, in electric wheel motors of this kind, to prevent infiltration of water and dust from the outside into the inside of the motor, a lip seal or a dust seal is inserted into a gap between a rotating part and a fixed part of the motor, to thereby maintain airtightness of the interior of the motor.

When the interior of the motor is thus kept airtight by means of such a lip seal or a dust seal, there is the disadvantage that if the ambient pressure changes or the temperature within the motor decreases and hence the pressure within the motor decreases when the motor is stopped, for example, a pressure difference occurs between the inside of the motor and the outside, thereof, which can cause infiltration of water, dust, etc. through a very small gap between the lip seal or dust seal and the associated parts of the motor. Such infiltration of water, dust, etc. is very difficult to prevent.

Generally, electric wheel motors of this kind can be frequently exposed directly to severe conditions of the road surface on which the vehicle is traveling. Therefore, countermeasures against the infiltration of water, dust, etc. have been strongly desired.

To overcome the above disadvantage, it has been proposed, for example, by Japanese Laid-Open Patent Publication (Kokai) No. 4-185533, to always keep the pressure within an electric wheel motor at a level higher than atmospheric pressure to thereby improve the watertightness and dust-tightness of the electric wheel motor.

However, the above proposed method requires the use of an air tank for supplying compressed air into the interior of the wheel motor and a regulator for regulating the pressure of the compressed air, which unfavorably leads to a large-scaled and complicated construction of the electric wheel motor

SUMMARY OF THE INVENTION

It is the object of the invention to provide an electric wheel motor which is simple in construction and has improved watertightness and dust-tightness.

To attain the object, the present invention provides an electric wheel motor mounted integrally in a wheel, comprising:

a motor main body having an inside and an outside;

at least one electric leader line extending from the inside of the motor main body to the outside thereof; and breather passage means provided in the at least one electric leader line and communicating the inside of the motor main body with the outside thereof.

Preferably, the at least one leader line has a tubular element provided therein, and the breather passage means comprises a breather passage formed in the tubular element.

Also preferably, the electric wheel motor includes an electric motor arranged in the motor main body, and a control circuit arranged in the motor main body, for driving the electric motor, and wherein the at least one electric leader line comprising at least one control line for supplying a control signal from the outside of the motor main body to the control circuit.

More preferably, the control line comprises a core line formed by a tubular element, and a plurality of signal lines arranged around the core line, the core line and the plurality of signal lines being bound together.

Advantageously, the breather passage means comprises a breather passage formed in the tubular element forming the core line of the control line.

Preferably, the electric wheel motor includes a reinforcing member having air permeability and arranged in the tubular element.

More preferably, the reinforcing member is formed of polyester fiber threads.

In a preferred embodiment of the invention, the electric wheel motor is mounted in a mounting object at a predetermined location thereof, the mounting object having an internal space at a location remote from the predetermined location. The breather passage has an opening located in the internal space.

The above and other objects, features, and advantages of the invention will be more apparent from the following detailed description taken in conjunction with the accompanying drawings.

DETAILED DESCRIPTION

The invention will now be described in detail with reference to the drawings showing an embodiment thereof.

Figure 1:
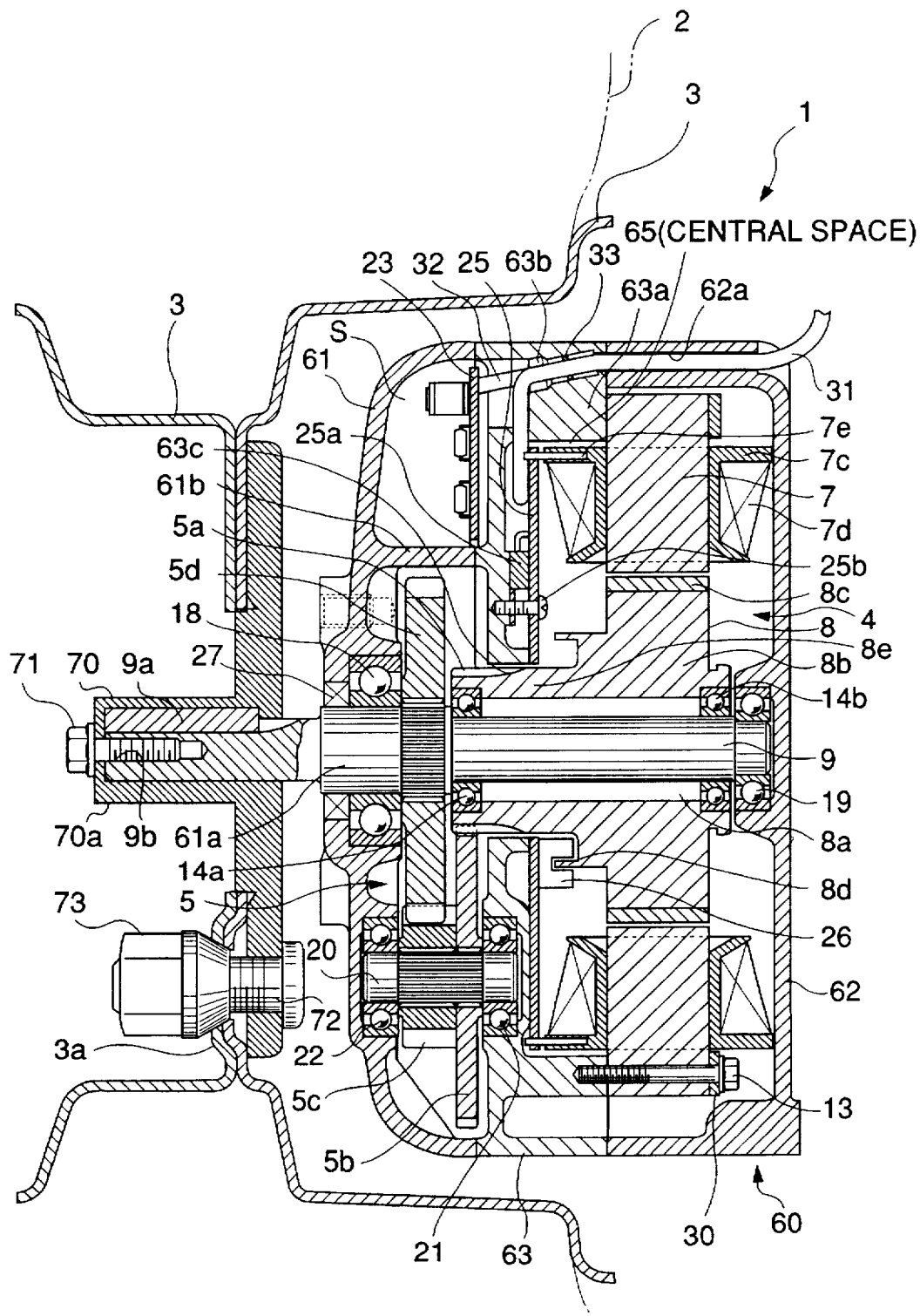
FIG. 1 is a longitudinal sectional view showing the construction of an electric wheel motor with a gear reducer, according to an embodiment of the invention.
Figure 2:
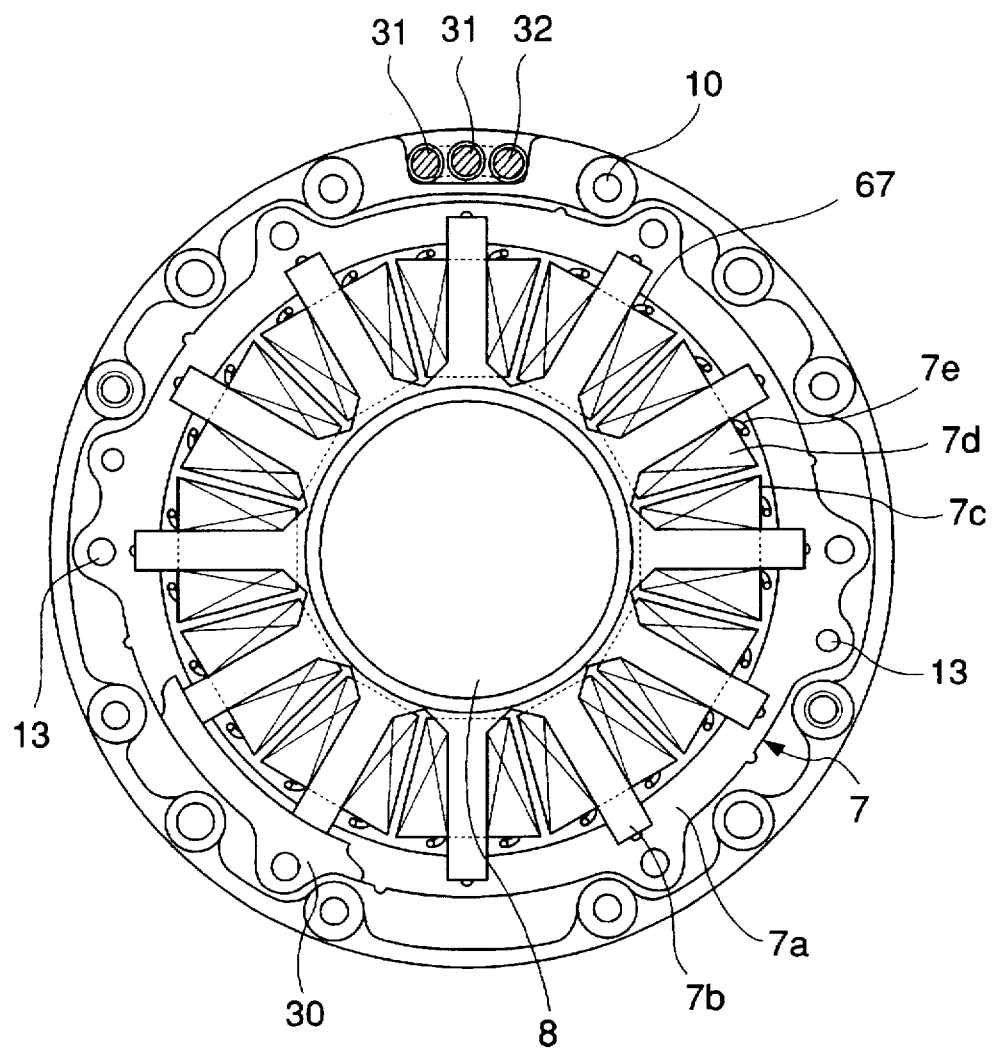
FIG. 2 is a transverse sectional view showing a section of the electric wheel motor in which an electric motor is mounted.

Referring first to FIGS. 1 and 2, there is illustrated the construction of an electric wheel motor according to an embodiment of the invention. The electric wheel motor according to the present embodiment is applied to an electric wheel motor with a gear reducer.

In FIG. 1, reference numeral 1 designates an electric wheel motor which has a housing 60 arranged in a central space defined in a wheel 3 with a tire 2 by an inner periphery thereof. The housing 60 accommodates an electric motor 4, and a gear reducer 5. A rotative output from the electric motor 4 is transmitted via the gear reducer 5 to the wheel 3 to rotatively drive the wheel 3.

The housing 60 is comprised of an outer casing (second casing) 61 having a generally cap-shaped configuration, an inner casing (first casing) 62, and a partition plate member 63 interposed therebetween. The outer casing 61, the inner casing 62 and the partition plate member 63 are fastened together by means of bolts 10. The outer casing 61, the inner casing 62 and the partition plate member 63 are formed of aluminum die castings.

The outer casing 61 has a central portion thereof formed therein with an axial through hole 61a, and a partition wall 61b formed integrally on an inner side surface thereof (i.e. inside the housing 60), which defines a space S having a horseshoe-shaped configuration and separated from the gear reducer 5.

The inner casing 62 has three holes 62a formed in an outer peripheral portion thereof and extending from the partition plate member 63 side to an outer end surface of the inner casing 62.

The partition plate member 63 has a stator-fitting portion 63a formed integrally on an outer peripheral portion thereof and axially projected toward the inner casing 62. The stator-fitting portion 63a has three holes 63b formed therethrough in axial alignment with the respective corresponding holes 62a of the partition plate member 63. Each hole 63b has a diameter larger than the diameter of the corresponding hole 62a.

The partition plate member 63 has a central portion thereof formed therein with a through hole 63c through which a thinned portion 8e of a hub of a rotor 8 penetrates in a fashion being out of contact therewith.

The electric motor 4 is a brushless type which is comprised of a stator 7 with a closed slot core, which is accommodated in the inner casing 62, the rotor 8 rotatably arranged in a central space defined by an inner periphery of the stator 7, and an output shaft 9 disposed to transmit a rotative output from the rotor 8 through the gear reducer 5 to the wheel 3.

The electric motor 4 mainly formed of the stator 7 and the rotor 8 has a short axial length, presenting a generally flat configuration, which realizes a shorter axial size of the whole wheel motor 1, i.e. a shorter size thereof along the output shaft 9.

The stator 7 has a magnetic pole core 7b, and a yoke core 7a arranged around the outer periphery of the magnetic pole core 7b. The magnetic pole core 7b is formed of a laminate of a multiplicity of magnetic sheets (electromagnetic steel sheets) formed integrally with a plurality of projections as pole teeth extending radially outward from a central annular portion through which the rotor 8 penetrates. The pole teeth are arranged circumferentially of the central annular portion at equal intervals, with closed slots formed between each adjacent pair of pole teeth by the central annular portion.

Three-phase field coils 7d are wound on the respective pole teeth of the magnetic pole core 7b via coil bobbins 7c, forming a three-phase stator winding.

The yoke core 7a is formed of a laminate of a multiplicity of annual magnetic sheets formed with a plurality of notches in an inner periphery thereof. These notches in the inner periphery each form an engaging groove in which the tip of a corresponding pole tooth of the magnetic pole core 7b is fitted.

The outer periphery of the yoke core 7a is held between the stator-fitting portion 63a of the partition plate member 63 and a retaining plate 30 and fixed to the stator-fitting portion 63a by means of bolts 13.

The rotor 8 has a rotor main body (enlarged diameter portion) 8b having an axial through hole 8a formed therein in coaxial relation to the axis of rotation of the rotor 8 and axially extending through the whole length of the rotor 8, and a plurality of permanent magnet members 8c secured to an outer peripheral portion of the main body 8b at circumferentially equal intervals. The thinned portion (reduced diameter portion) 8e of the rotor 8 axially extends integrally from one end of the main body 8b and has a longer axial size than that of the main body 8b. The tip of the thinned portion 8e is formed integrally with teeth forming a first gear 5a of the gear reducer 5. The main body 8b, which is shorter in axial length than the thinned portion 8e, is rotatably fitted in a central space defined in the stator 7 by an inner periphery thereof, in facing relation thereto. The rotor 8 is rotatably supported on the output shaft 9 by means of bearings 14a and 14b formed by ball bearings or the like, which are force-fitted between the rotor main body 8b and the thinned portion 8e and the output shaft 9, for rotation about the output shaft 9.

The rotor 8 has a projection 8d axially projected toward the partition plate member 63, for detecting the position of the rotor 8. The projection 8d has notches, not shown, formed therein and arranged at circumferentially equal intervals.

The output shaft 9 has a key slot 9a, and a threaded hole 9b formed at one end thereof, for fitting the electric wheel motor 1 to the wheel 3. A fitting member 70 has a boss 70a thereof fitted on the one end of the output shaft 9 and secured thereto by means of a bolt 71 screwed in the threaded hole 9b. The fitting member 70 is further secured to a hub 3a of the wheel 3 by means of bolts 72 and nuts 73, to thereby fix the electric wheel motor 1 to the wheel 3. An intermediate portion of the output shaft 9 is rotatably supported in the axial through hole 61a of the outer casing 61 via a bearing 18 formed by a ball bearing or the like, and the other end of the output shaft 9 in a central recess formed in the inner casing 62 via a bearing 19 formed by a ball bearing or the like, respectively. A gap between the intermediate portion of the output shaft 9 and the axial through hole 61a of the outer casing 61 is sealed by a sealing element 27. The output shaft 9 extends through the axial through hole 8a of the rotor 8 in a fashion being out of contact with the inner wall of the hole 8a by means of the bearings 14a and 14b.

The gear reducer 5 is a double reduction type, which is comprised of a plurality of (four in the illustrated embodiment) gears, i.e. the gear 5a, and gears 5b, 5c and 5d. The first gear 5a is formed integrally on the tip of the thinned portion 8e (left end portion as viewed in FIG. 1) of the rotor 8, in concentricity with the rotor 8. The second and third gears 5b, 5c are both rigidly fitted on a common rotary shaft (supporting shaft) 20, for rotation in unison with each other. The second gear 5b is in mesh with the first gear 5a.

The rotary shaft 20 is located below the output shaft 9 in eccentricity therewith. The rotary shaft 20 is rotatably supported by the partition member 63 and the outer casing 61 such that an end portion of the rotary shaft 20 is rotatably fitted in a recess formed in the partition plate member 63 via a bearing 21 formed by a ball bearing or the like, and the other end portion in a recess formed in the outer casing 61 by means of a bearing 22 formed by a ball bearing or the like, respectively.

The fourth or final stage gear 5d is rigidly fitted on the output shaft 9 for rotation in unison therewith. The fourth gear 5d is in mesh with the third gear 5c. With the above stated arrangement, when the rotor 8 is rotated due to the action of a rotating magnetic field formed by the stator 7, the first gear 5a integral with the rotor 8 rotates together with the rotor 8, i.e. at the same rotational speed as the latter. A rotative output from the first gear 5a is transmitted through the second and third gears 5b, 5c while being reduced in speed, to the fourth gear 5d, whereby the output shaft 9 and the wheel 3 are rotated at the same rotational speed as the fourth gear 5d, i.e. at a reduced rotational speed, and in the same rotational direction as the rotor 8. For example, when the rotor 8 rotates in the positive direction at 750 rpm, the output shaft 9 and the wheel 3 rotate in the positive direction at a speed of 150 rpm as a result of speed reduction by the gear reducer 5, that is, a reduction ratio of 1:5.

A first circuit board 23, which forms a control circuit for driving the electric motor 4, is mounted in the space S defined by the partition plate member 63 and the horseshoe-shaped partition wall 61b of the outer casing 61 and secured to the partition plate member 63 by means of set screws, not shown. The first circuit board 23, which has a horseshoe-shaped surface configuration, has mounted thereon various circuit component parts (e.g. semiconductors) forming the control circuit for driving the electric motor 4.

A second circuit board 25 is mounted in a central space 65 formed in the partition plate member 63 and defined by the electric motor 4, which is driven by a signal from the control circuit formed on the first circuit board 23 to supply driving current to the electric motor 4. The second circuit board 25 is formed of a doughnut-shaped bus plate having an outer size smaller than the diameter of the central space 65 in the stator fitting portion 63a of the partition plate member 63. The bus plate is fixed to the partition plate member 63 by means of set screws 25b. The portions of the second circuit board 25 at which the second circuit board 25 is fixed to the partition plate member 63 by the set screws 25b are set so as to fall within a projection range of the rotor 8 with respect to the output shaft 9, i.e. such a range that power transmitters 25a mounted on the second circuit board 25 are located within a region axially opposed to the rotor 8. The first circuit board 23 and the second circuit board 25 are connected to each other by a cable and a connector, not shown.

The second circuit board 25 has a plurality of printed circuits, not shown, on both sides thereof, and through holes 67 formed therethrough, which are connected to the printed circuits. The through holes 67 are arranged along the outer periphery of the second circuit board 25 at circumferentially equal intervals, through which end portions 7e of the respective corresponding field coils 7d are connected to the second circuit board 25. The field coils 7d are connected to each other by securely connecting between each through hole 67 and the corresponding end portion 7e of the field coil 7d.

Mounted on a surface of the second circuit board 25, which faces the partition plate member 63, are a plurality of power transistors (power MOSFET's) 25a and other circuit component parts for supplying electric current to the field coils 7d via the end portions 7e thereof. The power transistors 25a and the other circuit component parts are connected to the respective corresponding printed circuits by soldering. The power transistors 25a are radially arranged on the second circuit board 25 with respect to the center of the second circuit board 25 (center of the output shaft 9), and mounted such that heat-radiating surfaces (surfaces facing the partition plate member 63) of the transistors 25a are in close contact, through an insulating sheet, not shown, with an end surface of the partition plate member 63 which faces the inner casing 62, and that at least part of the portions of the power transistors 25a in close contact with the partition plate member 63 axially face the rotor 8. Further, each power transistor 25a has its heat-radiating surface portion tightly held between the second circuit board 25 and the partition plate member 63.

A control line 32 is connected to the first circuit board 23 to supply control signals thereto from the outside. The control line 32 is guided via one of the holes 63b formed through the stator-fitting portion 63a of the partition plate member 63 and the corresponding hole 62a formed through the inner casing 62 and aligned with the hole 63a, to the outside of the housing 60. A slipout-preventing element 43, referred to hereinafter, is mounted on the control line 32 at a location corresponding to the hole 63a to protect the first circuit board 23 against a pulling force applied from the outside.

Figure 3:
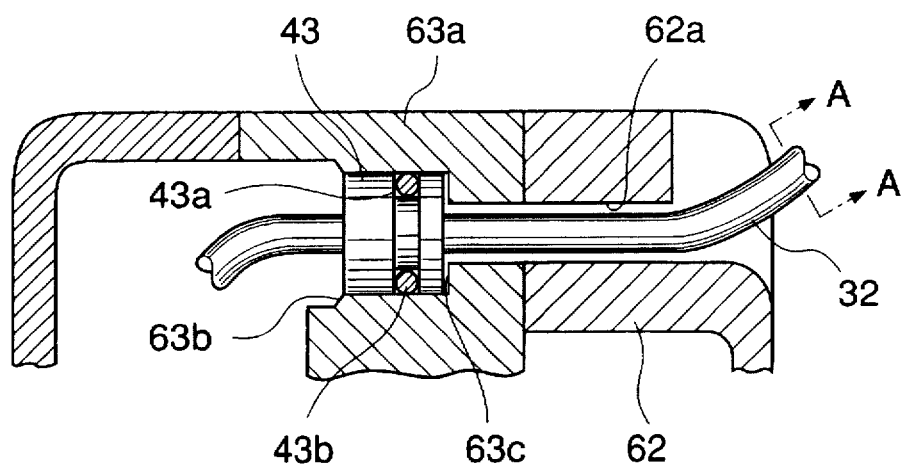
FIG. 3 is a fragmentary longitudinal sectional view showing a slipout-preventing element and its peripheral parts.

FIG. 3 shows how the slipout-preventing element 43 is mounted on the control line 32. The hole 63b formed through the stator-fitting portion 63a in which the slipout-preventing element 43 is mounted has an enlarged portion and a narrow portion with a stepped shoulder 63c formed therebetween. The slipout-preventing element 43, which is cylindrical in shape, is fitted in the enlarged portion in a fashion being engaged by the stepped shoulder 63c. The slipout-preventing element 43 has an outer peripheral surface thereof formed with an annular groove 43a in which an O ring 43b is fitted. The O ring 43b seals between the outer peripheral surface of the slipout-preventing element 43 and the inner surface of the enlarged portion of the hole 63b to thereby maintain airtightness of the interior of the wheel motor.

Figure 4:
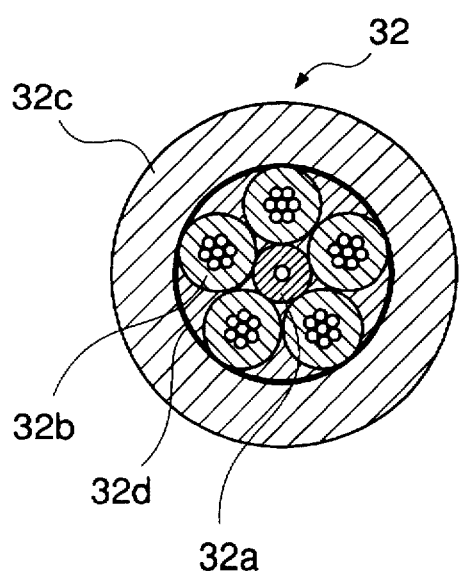
FIG. 4 is a transverse sectional view taken along line A—A and showing a control line appearing in FIG. 1.

FIG. 4 shows a section of the control line 32 taken along arrow A—A in FIG. 3. The control line 32 is comprised of a tube 32a as a core, five signal lines 32b twisted around the tube 32a, the tube 32a and the signal lines 32b being bound together with a silk paper tape 32d, and a PVC covering material 32c having an outer diameter of 4.20 mm covered over the bundle of the core 32a and the signal lines 32b. The tube 32a is stuffed with a bundle of polyester fiber threads having air permeability as a reinforcing material such that formation of a passage inside the tube 32a is ensured. The use of the reinforcing material prevents the passage inside the tube 32a from collapsing even if the control line 32 is bent.

The control line 32 leads to an internal space in a mounting object, such as a vehicle or a like apparatus having the wheel 3, located at an inner side thereof, in which is accommodated a controller, not shown, which is connected to the electric wheel motor 1, and the control line 32 is connected to a control circuit and/or a connector within the internal space. Such an internal space is usually remote from the electric wheel motor 1, and therefore under comparatively good environmental conditions. Therefore, the electric wheel motor 1 can carry out a breathing action with a change in the pressure within the wheel motor through an open end of the tube 32a which opens into ambient air which is clean and fresh and not exposed to water, dust, etc.

On the other hand, a pair of electric power lines 31 are connected to the second circuit board 25 to supply direct current for driving the electric motor 4, from the outside. The electric power lines 31 are guided via the two other corresponding holes 63b of the stator-fitting portion 63a, and then via the respective corresponding holes 62a of the inner casing 62 which are aligned with the holes 63b, to the outside of the housing 60. Slipout-preventing elements 33 are mounted on the electric power lines 31 at respective location corresponding to the holes 63b, similarly to the control line 32, to protect the second circuit board 25 against a pulling force applied from the outside.

In the present embodiment, as stated above, the tube 32a connecting between the inside of the wheel motor 1 with the gear reducer and the outside of the same is arranged within the control line 32, but this is not limitative. Alternatively, the tube 32a may be arranged within one or more of the power lines 31. In this alternative case as well, the same result as stated above can be obtained.

As described above, according to the present embodiment, the gap between the intermediate portion of the output shaft 9 and the axial through hole 61a of the outer casing 61 is normally sealed by the sealing element 27. However, if atmospheric pressure changes or the temperature within the electric motor decreases and hence the pressure within the electric motor decreases upon stoppage of the motor, a breathing action is performed through the tube 32a arranged inside the control line 32, to thereby prevent a breathing action through the sealing member 27, etc. As a result, the electric motor can be protected from infiltration of water, dust, etc. through the sealing member 27 caused by the breathing action.

According to the present invention, since a breather passage communicating between the inside and outside of the motor main body is formed in at least one electric leader line extending from the inside of the motor main body to the outside of the same, the electric motor can be protected from infiltration of water, dust, etc., merely by replacing the existing electric leader line or lines used in the conventional wheel motor by one or ones according to the invention. Further, it is not required to provide an opening of the breather passage in the motor main body, through which a breathing action is performed, which simplifies the construction of a section of the motor in which the breather passage is formed. Besides, since a tubular element in which the breather passage is formed is provided in the electric leader line, the space for providing the breather passage is reduced to the minimum.

Still further, in the case where the breather passage is formed in at least one control line as the at least one electric leader line, the control line is preferably comprised of a tubular element as a core line, and a plurality of signal lines arranged or twisted around the tubular element in a fashion that the tubular and the signal lines are bound together. This can make the control line compact in size.

Besides, the opening of the breather passage is arranged in an internal space of a mounting object such as a vehicle, at a location remote from the location at which the motor is mounted. Thus, the opening of the breather passage is located under comparatively good environmental conditions, which leads to further improved watertightness and dust-tightness.

What is claimed is:

1. An electric wheel motor mounted integrally in a wheel, comprising:

a motor main body having an inside and an outside;

electric leader lines each having opposite ends and extending from said inside of said motor main body to said outside thereof; and breather passage means integrally formed in at least one of said electric leader lines, said breather passage means communicating between said opposite ends of said at least one of said electric leader lines, whereby said breather passage means communicates said inside of said motor main body with said outside thereof.

2. An electric wheel motor as claimed in claim 1, wherein said at least one leader line has a tubular element provided therein, said breather passage means comprising a breather passage formed in said tubular element.

3. An electric wheel motor as claimed in claim 1, including an electric motor arranged in said motor main body, and a control circuit arranged in said motor main body, for driving said electric motor, and wherein said at least one electric leader line comprising at least one control line for supplying a control signal from said outside of said motor main body to said control circuit.

4. An electric wheel motor as claimed in claim 2, including an electric motor arranged in said motor main body, and a control circuit arranged in said motor main body, for driving said electric motor, and wherein said at least one electric leader line comprising at least one control line for supplying a control signal from said outside of said motor main body to said control circuit.

5. An electric wheel motor as claimed in claim 3, wherein said control line comprises a core line formed by a tubular element, and a plurality of signal lines arranged around said core line, said core line and said plurality of signal lines being bound together.

6. An electric wheel motor as claimed in claim 5, wherein said breather passage means comprises a breather passage formed in said tubular element.

7. An electric wheel motor as claimed in claim 4, wherein said control line comprises a core line formed by said tubular element, and a plurality of signal lines arranged around said core line, said core line and said plurality of signal lines being bound together.

8. An electric wheel motor as claimed in claim 2, including a reinforcing member having air permeability and arranged in said tubular element.

9. An electric wheel motor as claimed in claim 8, wherein said reinforcing member is formed of polyester fiber threads.

10. An electric wheel motor as claimed in claim 1, wherein said breather passage has an opening, said electric wheel motor being mounted in a mounting object at a predetermined location thereof, said mounting object having an internal space at a location remote from said predetermined location, said opening of said breather passage being located in said internal space.

11. An electric wheel motor mounted integrally in a wheel, comprising:

a motor main body having an inside and an outside;

an electric motor arranged in said motor main body;

a control circuit arranged in said motor main body, for driving said electric motor;

at least one electric leader line extending from said inside of said motor main body to said outside thereof, said electric leader line comprising at least one control line for supplying a control signal from said outside of said motor main body to said control circuit, said control line comprising a core line formed by a tubular element, and a plurality of signal lines arranged around said core line, said core line and said plurality of signal lines being bound together; and breather passage means provided in said at least one electric leader line and communicating said inside of said motor main body with said outside thereof.

12. An electric wheel motor as claimed in claim 11, wherein said breather passage means comprises a breather passage formed in said tubular element.

13. An electric wheel motor mounted integrally in a wheel, comprising:

a motor main body having an inside and an outside;

an electric motor arranged in said motor main body;

a control circuit arranged in said motor main body, for driving said electric motor;

at least one electric leader line extending from said inside of said motor main body to said outside thereof, said electric leader line comprising at least one control line for supplying a control signal from said outside of said motor main body to said control circuit, said leader line having a tubular element provided therein, said control line comprising a core line formed by a tubular element, and a plurality of signal lines arranged around said core line, said core line and said plurality of signal lines being bound together; and breather passage means provided in said at least one electric leader line and communicating said inside of said motor main body with said outside thereof, said breather passage means comprising a breather passage formed in said tubular element.

14. An electric wheel motor mounted integrally in a wheel, comprising:

a motor main body having an inside and an outside;

at least one electric leader line extending from said inside of said motor main body to said outside thereof, said leader line having a tubular element provided therein; and breather passage means provided in said at least one electric leader line and communicating said inside of said motor main body with said outside thereof, said breather passage means comprising a breather passage formed in said tubular element; and a reinforcing member having air permeability and arranged in said tubular element.

15. An electric wheel motor as claimed in claim 14, wherein said reinforcing member is formed of polyester fiber threads.

16. An electric wheel motor mounted integrally in a wheel in a mounting object at a predetermined location thereof, said mounting object having an internal space at a location remote from said predetermined location, comprising:

a motor main body having an inside and an outside;

at least one electric leader line extending from said inside of said motor main body to said outside thereof; and breather passage means provided in said at least one electric leader line and communicating said inside of said motor main body with said outside thereof, wherein said breather passage means has an opening located in said internal space.

* * * * *